United States Patent [19]
Marlatt

[11] 3,982,500
[45] Sept. 28, 1976

[54] LINER FOR DOGHOUSE

[76] Inventor: Orlean F. Marlatt, 1823 E. Broadway, Enid, Okla. 73701

[22] Filed: Feb. 7, 1975

[21] Appl. No.: 547,764

[52] U.S. Cl. .................................................. 119/19
[51] Int. Cl.² ........................................... A01K 1/02
[58] Field of Search ...................................... 119/19

[56] References Cited
UNITED STATES PATENTS

| 109,166 | 11/1870 | Achenbach | 119/19 |
| 631,541 | 8/1899 | Hewitt | 119/19 X |
| 1,887,108 | 11/1932 | Steese | 119/19 |
| 3,861,356 | 1/1975 | Kulka | 119/19 |

*Primary Examiner*—Hugh R. Chamblee

[57] ABSTRACT

A liner for a doghouse has a tubular entry portion made of heavy material. One end is attached and adjusted to fit the dog-house opening and the other end is attached to the open end of a bag shaped plastic liner. A hook is mounted in the inside roof of the dog house and a ring or loop on the plastic liner is inserted over the ring to support the upper portion of the bag lining.

5 Claims, 6 Drawing Figures

LINER FOR DOGHOUSE

BRIEF DESCRIPTION OF THE INVENTION

This invention relates to a sanitary liner for a dog house or other similar enclosure, and in particular relates to a liner that has a wear resistant entrance and a washable or disposable sleeping portion.

BRIEF DESCRIPTION OF THE PRIOR ART

A U.S. Pat. No. 1,879,473 issued to E. A. Pitts discloses a shelter for a domestic animal and includes a separate bed with a right support for the entrance and material stretching from the entrance around the bed. It does not disclose a liner such as could be used in a dog house.

A second U.S. Pat. No. 2,854,948 is issued to D. Rayson and discloses a frame entrance with a sleeping bag sewed to the frame and extending rearward. Such an apparatus could not be adaptable as a liner since the bag is securely attached to the frame, and no means is provided for detaching the sleeping portion for disposing or washing of same.

DETAILED DESCRIPTION OF THE INVENTION

Figure 1:
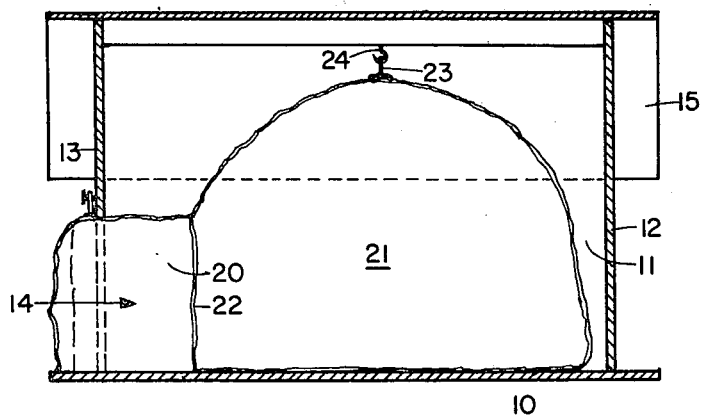
FIG. 1 is a side cross-section view of a dog house and dog liner.
Figure 2:
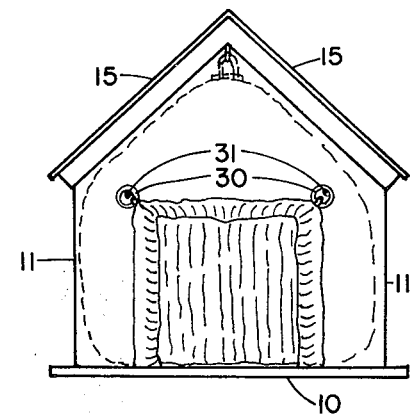
FIG. 2 is a front view of a dog house illustrating one method of attaching the liner to the entrance.

Referring to all the drawings but in particular to FIGS. 1 and 2, a dog house has a bottom 10, side walls 11, a back wall 12 and a front wall 13 which has an entrance generally referred to by arrow 14. A roof 15 covers the house.

The dog lining which fits into the house comprises two main portions, the entrance portion 20 which may be made of thick durable material such as heavy cotton, canvas in a heavy synthetic material such as nylon or rayon. The material is sewed into a generally rectangular configuration to conform to the normal shape of entrance 14. The entrance portion can also have a longitudinal separation to permit shaping the portion to various size entrances 14. The longitudinal separation can be secured together in any well known way such as pins, snaps, or a gripping strip more completely described in FIGS. 3a and 3b. The liner generally referred to by having a general bag shaped configuration in number 21 has its open end attached to entrance portion 20 at a seam 22 to be described later. Liner 21 has a loop 23 which is adapted to be secured over a hook 24 which has been screwed, for example, in the roof 5 of the dog house. Additional hooks 24 and loops 23 can be attached to the roof 15 and liner 21 as necessary for larger dog houses. Entrance portion 20 is attached to the entrance 14 in one of several ways. Referring to FIG. 2 rings 30 which are attached to the corner of Entrance portion 20 are slipped over nails and hooks 31 in a manner to stretch the material making the top snug with the upper portion of entrance 14. The bottom of the entrance portion 20 may be secured in like manner.

In use the liner 21 is attached (to be described) or sewed to the entrance portion 20 and the assembly inserted in to the dog house. Ring 25 is then placed over hook 24 and the liner spread out around the dog house. Entrance portion 20 is then pulled out of the entrance and the rings 30 secured over the nails 31. The liner is now ready for use.

Figure 3A:
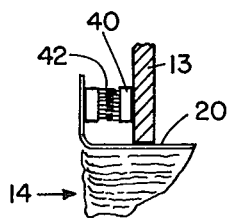
FIGS. 3a and 3b are illustrations of other methods of attaching the liner to the entrance.
Figure 3B:
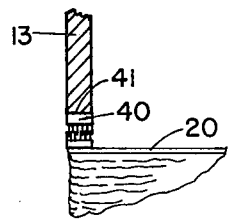

Referring to FIGS. 3a and 3b other means are illustrated for attaching entrance portion 20 to entrance 14. A gripping strip 40 made of material and having a plurality of small extending filliments is glued or nailed around entrance portion 14. A corresponding gripping strip 42 is secured to the edge of portion 20. The portion 20 is then mated to strip 40 by means pressing 42 into 40. The gripping strips are well known and need not be specifically described.

FIG. 3b is an alternate embodiment of FIG. 3a where the gripping strips 40 is attached to the under edge 41 of front wall 13. Strip 42 is secured in the same manner to strip 40 as described in FIG. 3a.

Figure 4:
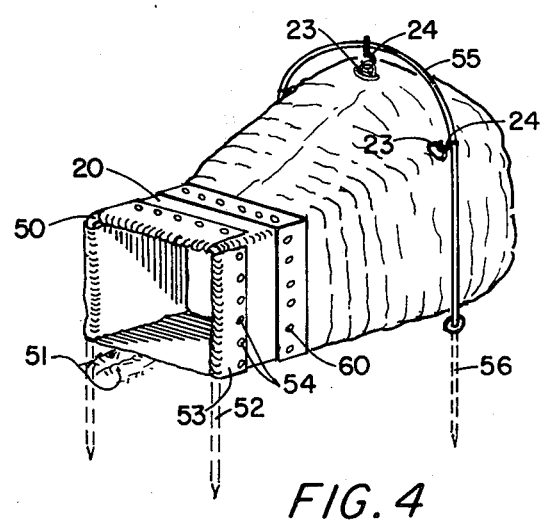
FIG. 4 is a perspective view of the liner used externally.

FIG. 4 illustrates an alternate use of the lining where entrance portion 20 is attached to a U-shaped member 50 which is forced in to the ground 51 as illustrated by insertions 52. Flaps 53 may be folded around member 50 and snapped with snappers 54, for example, liner 21 can be held open by means of a second U-shaped. Member 56 is inserted into ground 51 by a portion 56. Portion 55 has hooks 24 secured thereto as described in FIGS. 1 and 2. Also loops in rings 23 can be attached as previously described.

Figure 5:
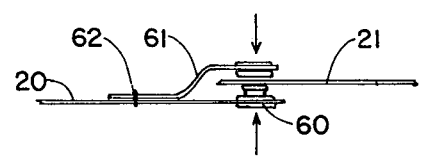
FIG. 5 is an illustration of a method of attaching a plastic liner to the canvas entrance piece.

Referring to FIG. 5 as one method of connecting liner 21 to heavy canvas entry portion 20 is illustrated. A plurality of snaps 60 is attached to portion 30 around its periphery. A second canvas portion 61 is sewed to canvas portion 20 at 62 and a meting snap is secured therein. Plastic, for example, liner portion 21 is then inserted between snaps 60 and 61 and there snaps are pressed together in the direction of the arrows trapping the material between the snaps.

It is obvious that other changes and alterations can be made to this invention as specifically described and still be within the spirit and scope of this invention as described in the specification and appended claims.

What I claim is:

1. In combination with a doghouse having side walls, a roof and an entrance, a liner having an entrance portion with first and second ends and a bag lining portion, means for securing said bag lining portion to said first end, means for releasably rigidly securing said second end around the entrance of said doghouse and means for releasably attaching the outside of said bag portion at at least one location to the inside of said roof of said doghouse.

2. A liner as described in claim 1 where said second end of said entrance liner is attached to said entrance by means of a gripping strip mounted on said second end and a mating strip mounted around said entrance.

3. A liner as described in claim 1 wherein said entrance portion has a plurality of mating snaps mounted around said one end and means for inserting said lining portion between said mating snaps to secure said lining portion to said entrance portion when said snaps are pressed together.

4. A supporting apparatus for a doghouse liner having a substantially rectangular entrance portion with a first and second end and a liner portion having a bag configuration with its open end attached around one of said ends of said entrance portion, a first U-shaped support means, means for attaching the remaining end of said entrance portion to said U-shaped support means, a second substantially larger U-shaped support means, and means for releasably attaching said liner portion of said second support means.

5. A supporting apparatus as described in claim 4, wherein said first and second U-shaped members are secured into a portion of the ground in a substantially upright position, said second support means including a hook means for securing said liner portion thereto.

* * * * *